Figure 1:
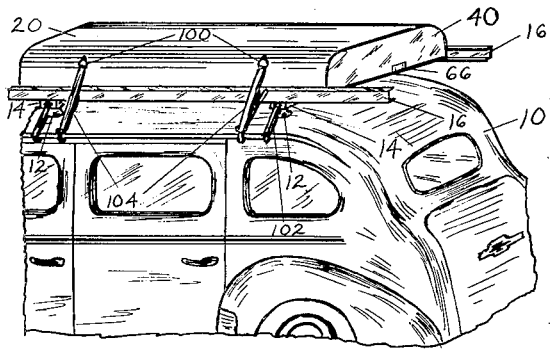

Dec. 12, 1950  F. NEUHAUS  2,533,683
PORTABLE STRUCTURE

Filed Jan. 24, 1949  2 Sheets-Sheet 1

INVENTOR
Frederick Neuhaus
BY
Rey Eilers
ATTORNEY

Dec. 12, 1950  F. NEUHAUS  2,533,683
PORTABLE STRUCTURE
Filed Jan. 24, 1949  2 Sheets-Sheet 2

INVENTOR
Frederick Neuhaus
BY Rey Eilers
ATTORNEY

Patented Dec. 12, 1950

2,533,683

UNITED STATES PATENT OFFICE 2,533,683

PORTABLE STRUCTURE

Frederick Neuhaus, St. Louis, Mo.

Application January 24, 1949, Serial No. 72,437

2 Claims. (Cl. 5—119)

This invention relates to improvements in portable structures. More particularly, this invention relates to improvements in portable structures that can be carried atop an automotive vehicle but can be extended to form a shelter in which one or more persons can sojourn in comfort.

It is therefore an object of the present invention to provide a portable structure which can be carried atop an automotive vehicle but can be extended to form a shelter in which one or more persons can sojourn in comfort.

It is frequently desirable to have a portable structure which is neat and compact and can be carried within or atop an automotive vehicle but can be extended to form a shelter in which one or more persons can sleep while being protected from the elements. Such a structure enables those persons to enjoy the pleasures of out-of-doors life without the discomforts frequently attendant upon such life. One type of portable structure that has often been used is the tent; and tents are light in weight and can be folded into a small space. However, tents are rather unstable in a high wind, they frequently leak, they offer but little protection against human or animal intruders, they require "ditching," any they are often difficult to set up and take down. In most instances where the tent is small enough to be handled readily it requires the user to sleep on the ground; and where the tent is large enough to accommodate sleeping equipment, it is too large to be handled readily. Another type of portable structure that is frequently used is the trailer; and trailers can be made quite sturdy and quite complete. However, trailers are expensive to buy or build, they require additional licenses, they require sizable storage areas when not in use, and they greatly increase the load on the driving and stopping mechanism of the automotive vehicle. The other principal type of portable structure that has been proposed or used consists of walls that are secured to the automotive vehicle but can be extended to form a shelter. These walls can be of cloth and can be erected in much the manner of tents, or they can be inflexible and can be telescoped to form a sturdy shelter. However, the resulting shelters are frequently so small that the user can not stand erect within them, and in some instances the user must climb atop the automotive vehicle to enter the shelter. This is a feat beyond the capabilities of some, and the weight of the user places an undue load on the upper portions of the vehicle. Moreover, in many instances these latter structures require rebuilding of portions of the automotive vehicle; an expensive operation and one which can destroy the water-tightness of the vehicle. For these various reasons, prior portable structures are objectionable. The present invention obviates these objections by providing a sturdy, light-weight, compact structure which can be carried atop an automotive vehicle without necessitating any changes in that vehicle, but which can be extended to form a shelter which is independent of the vehicle and in which one or more persons can sojourn in comfort. It is therefore an object of the present invention to provide a sturdy, light-weight, compact structure which can be carried atop an automotive vehicle without necessitating modification of that vehicle.

The portable structure provided by the present invention is provided with a door that can be locked, and it is also provided with walls that are firmly secured to the stanchions of that structure. As a result, that structure provides a good measure of protection against human and animal intruders. It is therefore an object of the present invention to provide a portable structure which has a door that can be locked and which has walls that are firmly secured to the stanchions of that structure.

The portable structure provided by the present invention is releasably held by guides which are supported atop the automotive vehicle; and when the structure is extended to form a shelter, it can be left in engagement with those guides or it can be separated from those guides. As a result, the automotive vehicle can be used freely without necessitating the folding of the structure each time, and this makes it possible to place the portable structure at one place and then use the vehicle to visit adjoining areas. It is therefore an object of the present invention to provide a portable structure which is releasably held by guides that are supported atop an automotive vehicle.

The structure provided by the present invention is provided with a floor that is spaced above the ground, and this floor will remain dry even though the ground is wet. This floor will also serve as a closure for the structure when that structure is extended and will thus help keep the structure warm. It is therefore an object of the present invention to provide a floor that closes the structure when that structure is extended and will remain dry though used on wet ground.

Portable structures which are carried atop automotive vehicles are customarily provided with a cover that is intended to keep the elements of the structure free of dirt and water. Such covers are not satisfactory because they tend to blow away when the vehicle is moving at high speeds, they frequently admit dirt and water around their edges, and they are difficult to secure to the structure. The present invention obviates all need for a cover by providing a structure which has a support with downwardly directed edges that form a water-tight, open-bottomed enclosure, and that has walls that close the bottom of the inclosure. When the walls are in position beneath the support, virtually all water and dirt will be excluded from the enclosure. It is therefore an object of the present invention to provide a portable structure with a support that has downwardly directed edges to form a water-tight open-bottomed inclosure, and that has walls which close the bottom of the inclosure.

The portable structure provided by the present invention has stanchions which can support framed bed springs, thus providing comfortable bunks for sleeping. The frames of the springs coact with the stanchions to stiffen the structure when it is extended, and they fit within the inclosure of the structure when that structure is folded. It is therefore an object of the present invention to provide a portable structure that can support framed bed springs when extended and can inclose those springs when folded.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
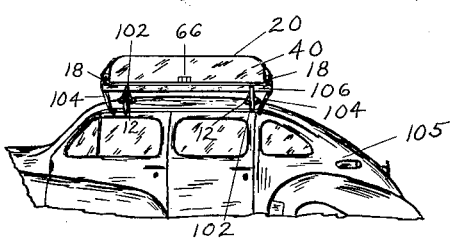
Figure 3:
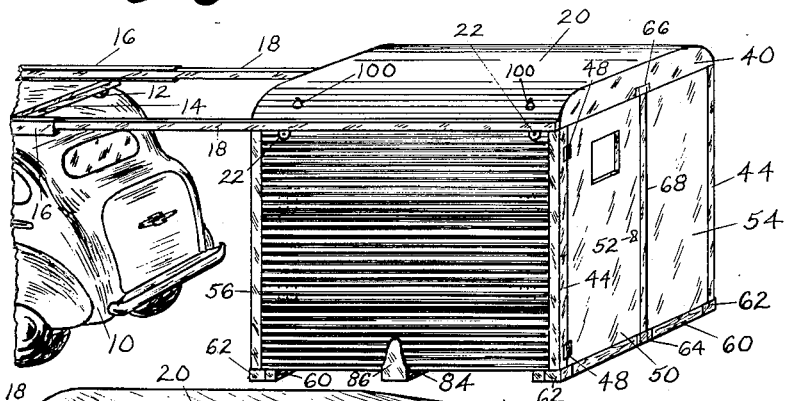
Figure 4:
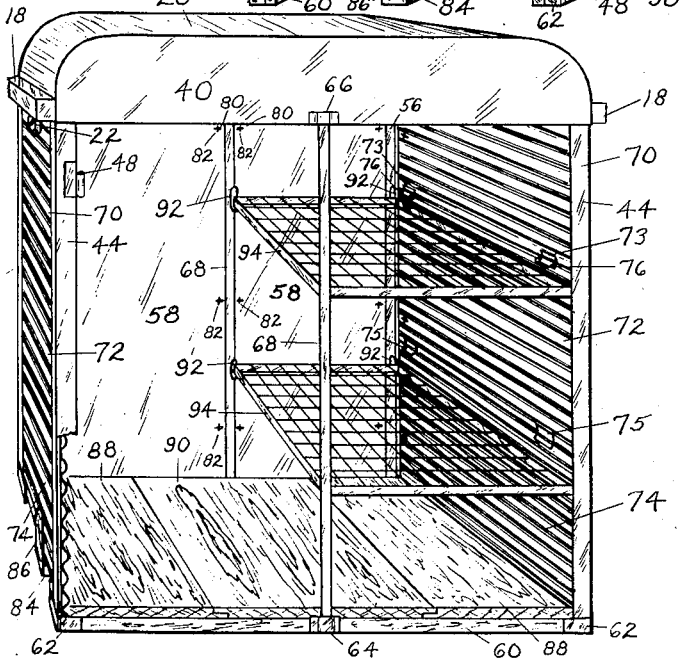
Figure 5:
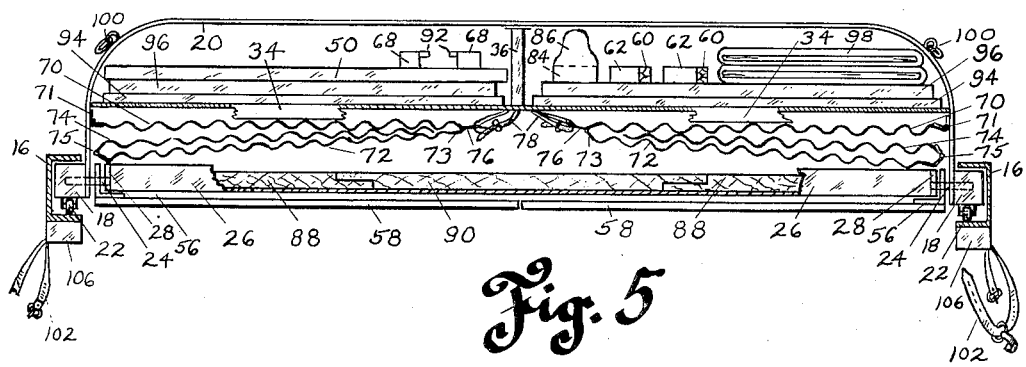
Figure 6:
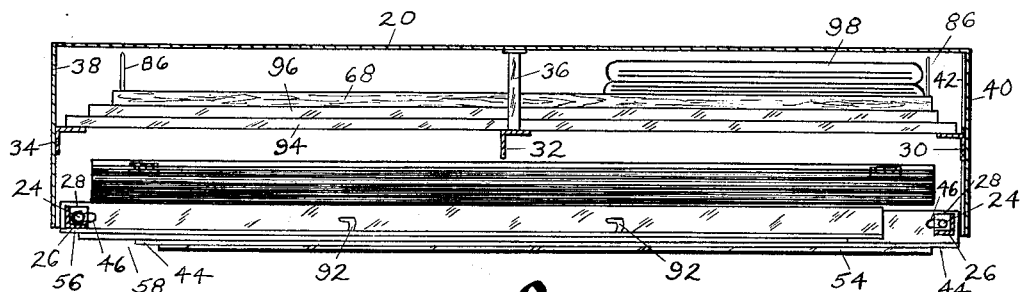
Figure 7:
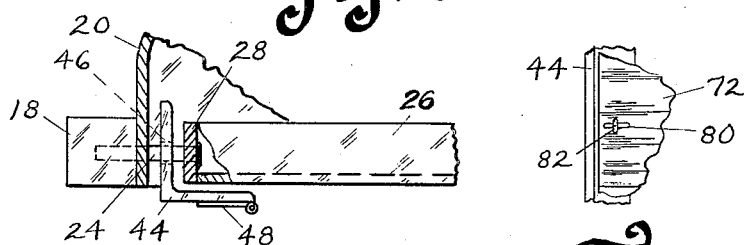
Figure 9:
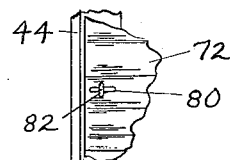
Figure 8:
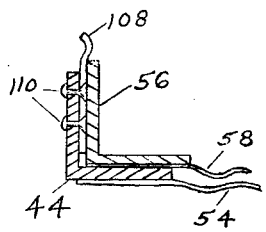

In the drawing, Fig. 1 is a partial, perspective view of the portable structure of the present invention atop an automotive vehicle which has a rather blunt rear end, Fig. 2 is a partial, side elevational view of the portable structure of the present invention atop an automotive vehicle which has a streamlined rear end, Fig. 3 is a perspective view of the portable structure of the present invention in extended position adjacent the rear end of the vehicle shown in Fig. 1, Fig. 4 is a partially broken-away, perspective view of the portable structure of Figs. 1–3, Fig. 5 is a partially broken-away, end view of the portable structure of Figs. 1–4, and it shows that end of the structure which is at the left of Fig. 6, Fig. 6 is a cross-sectional, side view of the structure of Figs. 1–5, Fig. 7 is a partially-broken, end elevational view of a portion of the structure shown in Figs. 1–6; and it shows that end of the structure which is at the right of Fig. 3, Fig. 8 is a cross-sectional end view of two of the stanchions of the portable structure of the present invention, and Fig. 9 is a broken, side elevational view showing a stanchion and a portion of a side panel of the portable structure of Figs. 1–6.

Referring to the drawing in detail, the numeral 10 denotes an automotive vehicle with a blunt rear end; and that vehicle has a number of suction cups 12 secured to the top thereof in the usual and customary manner. The suction cups 12 are secured to and support transversely extending wooden bars 14. The suction cups 12 and the transversely extending wooden bars 14 are standard articles of manufacture and usage; and they are used with, rather than constitute a part of, the present invention. The transverse wooden bars 14 are located adjacent the opposite ends of the roof of the vehicle 10, and they are held fixedly in place by the suction cups 12. By using suction cups 12 and transverse bars 14, it is possible to support the portable structure atop the automotive vehicle 10 without modifying or changing that vehicle.

A pair of spaced guides 16, in the form of channels with their open sides confronting each other, are secured to the outer ends of the transverse wooden bars 14 by bolts, screws or other means; and these guides are set parallel to each other. The guides 16 are preferably made of a light-weight metal such as aluminum or magnesium, and they are made of sufficient cross section to be stiff. The guides 16 slidably support rods 18 which are disposed within the guides 16; and the rods 18 are secured to the downwardly directed edges at the sides of a support 20. This support has a downwardly directed edge 38 at one end thereof and has a downwardly directed edge 40 at the other end thereof; and the four downwardly directed edges of the support 20 cooperate with that support to form a water-tight, open-bottomed inclusure. The downwardly directed edge 40 is separable from the support 20, but it has a flange 42 that closely fits the support 20 and its downwardly directed side edges. If desired, a gasket could be provided between the removable edge 40 and the downwardly directed side edges and top of support 20; and such a gasket would make the enclosure absolutely watertight. Moreover, bolts and nuts can be used to secure removable edge 40 to the support 20.

The rods are secured along the downwardly directed side edges of the support 20 and they stiffen those edges. The rods 18 have rollers 22 depending therefrom, and those rollers fit within and roll relative to the guides 16. The rollers 22 make it easy to slide the support 20 and its rods 18 backwards and forwards relative to the guides 16. The rods 18 and the side edges of the support 20 have pins 24 extending through them at the opposite ends thereof, and those pins project into the supporting plates 28 on the ends of angles 26. The ends of the angles 26 and the plates 28 are spaced inwardly from the inner surfaces of the side edges of support 20, and the pins 24 span the distance between the support 20 and the plates 28. The plates 28 stiffen the angles 26, and they also provide an effective means of securement between the pins 24 and the angles 26. The pins 24 and the angles 26 stiffen the downwardly directed edges of the support 20, and they also positively space the rods 18 apart a distance sufficient to hold them in the guides 16.

The downwardly directed edges of the support 20 are also stiffened by angles 30 and 34; angle 30 being located adjacent one end of support 20, and angle 34 being located adjacent the opposite end of that support. The angles 30 and 34 are disposed above the plane of the angles 26 and they have horizontal portions extending inwardly into the inclosure formed by the support 20 and its downwardly directed edges. Another angle 32 is disposed transversely of the support 20, and that angle is located adjacent the horizontal and vertical middles of support 20. A rod 36 extends from the approximate center of the support 32 to the approximate center of support 20; and the various angles 26, 30, 32 and 34 and the rod 36 provides considerable stiffening for the support 20. The support 20, angles 26, 30, 32 and 34, and rod 30 are preferably made of a light-weight metal such as aluminum or magnesium; and where this is done they will provide a stiff and sturdy support that is light in weight.

A plurality of stanchions 44 are provided adjacent the removable, downwardly directed edge 30 of support 20, and each of those stanchions has a slot 46 at the upper end thereof. The slots 46 are dimensioned so they receive and telescope over the pins 24 which extend between the rods 18 and the plates 28. In assembling the stanchions 44 with the support 20, the stanchions are placed in register with the pins 24 and those pins are made to pass through the slots 46 before those pins are secured to the rods 18 and the plates 28. As a result, the engagement between the slots 46 of stanchions 44 and the pins 24 of support 20 permanently secures the stanchions 44 to the support 20. The slots 46 also provide a certain amount of play between the stanchions and the support 20, and this play facilitates prompt and easy extension and folding of the portable structure. As indicated in Figs. 6 and 7 the stanchions 44 can be set in horizontal position, and as indicated in Figs. 3, 4 and 9 they can be set in vertical position. When the stanchions 44 are vertical, the pins 24 will move to the lowest portions of slots 46 and will come to rest; consequently it is clear that the stanchions 44 directly support the left hand end of support 20.

One of the stanchions 44 is provided with vertically spaced hinge plates 48, and those hinge plates will be in register with complementary hinge plates on the door 50 that is provided for the portable structure. This door can readily be secured to or released from the stanchion 44 by selectively engaging and disengaging the hinge plates on the door and stanchion. The door 50 is provided with a keyhole 52 that permits the insertion of a key into a lock, not shown; and that lock will engage stanchion 68 and prevent undesired opening of the door 50.

The other stanchion 44 is shown in Figs. 5, 6 and 8 as carrying a wall 54 which may be made of plywood, pressed wood, sheet metal, corrugated metal, or any other suitable material. When permanently secured to the stanchion 44, as shown in Figs. 5, 6 and 8, wall 54 will move with that stanchion when that stanchion is folded underneath the support 20, as shown in Fig. 6. However, wall 54 can be supported independently of stanchion 44, as by having its upper edge hinged to the angle 26 which is adjacent removable edge 40; and that wall can then be moved to vertical position, as shown in Fig. 3, or it can be disposed out of sight within support 20, as shown in Fig. 4. Where the wall 54 is hinged to angle 26, it can be releasably secured to stanchion 44 along its outer edge by latches 32 that are rotatably secured to stanchion 44 and selectively extend through slots 80 in the wall 54. This latter arrangement permits the entire end of the shelter to be left open, as shown in Fig. 4, or to be fully closed, as shown in Fig. 3. The wall 54 can be held up within support 20 by a hook, strap or clamp, not shown, on support 20.

Two stanchions 56, generally similar to the stanchions 44, are provided adjacent the downwardly directed edge 38. As is the case with the stanchions 44, the stanchions 56 are provided with elongated slots 46; and those slots telescope over and are held by pins 24 which extend between the rods 18 and the angle 26 which is adjacent edge 38. Each of the stanchions 56 can have a wall 58 permanently secured to it, as shown in Figs. 5, 6 and 9; and in that case, the walls 58 will move with the stanchions 56 when they are in vertical position or when they are folded under the support 20, as shown in Fig. 6. However, if desired, the walls 58 may be supported independently of stanchions 56, as by having their upper edges hinged to the angle 26 which is adjacent edge 38. The walls 58, which are each approximately one half (½) the width of support 20, can then be moved to vertical position, as shown in Fig. 4, or can be moved out of sight within support 20. In vertical position, the walls 58 can have their outer edges secured to stanchions 56 by latches 82 which are rotatably mounted on stanchions 56 and selectively extend through slots 80 in the walls 58; and in horizontal position, the walls 58 can be held by hooks, straps or clamps, not shown on support 20.

When the stanchions 56 are folded into the position shown in Fig. 6, the stanchions 44 will underlie those stanchions and hold them against accidental retraction. Suitable spring clips 108, shown in Fig. 8, which are riveted to the stanchions 44 by rivets 110, will slip past the vertical portions of the stanchions 56 and prevent accidental movement of any of the stanchions 44 and 56 downwardly. However, the material of which the spring clips 108 are made is flexible enough so a slight pressure on the ends of the stanchions will quickly separate them and permit prompt extension of the portable structure.

The confronting edges of the walls 58 and the underlying wall 54 will substantially close the bottom of the support 20 when those walls are folded under that support, and thus they will constitute a splash-proof closure for the support 20. While the walls 54 and 58 could not prevent the entrance of water into the inclosure if the support 20 was immersed in water, they do largely obstruct and close the open bottom of support 20 and thereby keep virtually all rain and splashed water out of that inclosure. This is very desirable because it makes certain that folding of the structure automatically guards against the entry of rain or dust. By doing so, the walls 54 and 58 make a cover for support 20 unnecessary.

The walls 54 and 58 are shorter than the stanchions 44 and 56; and as a result, the stanchions 44 and 56 extend down below the bottoms of the walls 54 and 58. The lower ends of the stanchions extend into L-shaped receptacles 62 which are located at the opposite ends of spacing plates 60. These plates will be relatively heavy plates of wood and they will be as long as the angles 26, with the result that the bottoms of the stanchions 44 and 56 will be in register with the receptacles 62 at the ends of the plates. The stanchions 44 and 56, which are preferably L-shaped angles, will fit snugly within the receptacles 62 and will be held against horizontal movement or tilting movement by their engagement with those receptacles. Consequently, once the stanchions 44 and 56 are moved to a vertical position and have their lower ends slipped into the receptacles 62 on the ends of the spacing plates 60, those stanchions will begin to hold the support 20 in position. Receptacles 64 are provided adjacent the mid-points of the spacing plates 60, and those receptacles are in register with receptacles 66 on the downwardly directed edges 38 and 40 of the support 20. The receptacles 64 and 66 receive removable stanchions 68 that are approximately the length of the stanchions 44 and 56; and the walls 54 and 58 can have their inner edges releasably secured to the stanchions 68 by latches 82 that are rotatably mounted on stanchions 68 and selectively extend through slots 80 in walls 58.

The door 50, the wall 54 and the two walls 58 form the end walls of the shelter of which support 20 is the top. The sides of that shelter consist of two sets of side panels 70, 72, and 74. These side panels are shown as being made of corrugated metal, but they can be made of sheet metal, plywood, pressed wood or other suitable material. The side panels, which are three in number, are secured together by hinges; the panels 70 being secured directly to the support 20 by hinges 71, panels 70 and 72 being secured together by hinges 73, and panels 72 and 74 being secured together by hinges 75. With this arrangement, the sides of the shelter can be folded up or extended downwardly. This is desirable since it provides privacy when privacy is required but will provide adequate ventilation when privacy is not necessary. Moreover, it facilitates storing of the side panels 70, 72 and 74 in a compact space, as is particularly illustrated in Figs. 5 and 6. For convenience in storing, the panel 74 is folded against the panel 72 and then panels 74 and 72 are folded against panel 70. The ends of panels 72 and 74 adjacent hinges 75 will rest upon the angles 26, and the ends of panels 70 and 72 adjacent hinges 73 will be supported by straps 78 which pass through loops 76 connected to the hinges 73.

When the side panels 70, 72 and 74 are folded together they are stored neatly within the support 20 and are held by the conjoint action of the hinges 71 and the straps 78. If desired, hooks or clamps could be substituted for straps 78. When those panels are extended downwardly to close the sides of the shelter, those panels will be held solidly against the stanchions 44 and 56 by rotatable latches 82 which are carried by those stanchions and will extend through slots 80 in the panels 70, 72 and 74. The slots 80 will be in register with the latches 82 and will telescope over them. Once this has happened, latches 82 can be set transverse of the slots 80 to prevent accidental separation of the side panels from the stanchions. In this way, the panels are positively secured to the stanchions at spaced points along their lengths, and thus a solid securement of the side walls to the stanchions is attained. This solid securement cooperates with the securement of the end walls 54 and 58 to the stanchions 44 and 56 to make the shelter both rigid and proof against intrusion.

A plate 84 is disposed midway between the spacing plates 60, and that plate also is disposed transversely of the support 20. Confining projections 86 are provided at each end of the plate 84, and those confining projections extend upwardly below the lower edges of the panels 74 and hold those panels inwardly against the floor of the shelter. The plate 84 is dimensioned so the fit between the projections 86 and the side panels 74 is tight enough to force those panels against the outer two panels 88 of the floor. These two panels have mortise and tenon joints with the central panel 90 of the floor; and when the central panel 90 is set in place, it holds the side panels 88 of the floor solidly against the panels 74 of the side walls. In this way, a tight seal is provided along the length of the floor with the side panels 74 to keep out moisture and prevent intrusion by humans or animals. The plates 60 and 84 will space the floor above the ground and will keep that floor dry even though the ground is wet. By having the outer edges of the central panel 90 of the floor overlie the inner edges of the side panels 88, it is possible to obtain ready removal of the central panel 90 without disturbing the outer panels, and then thereafter those outer panels can quickly be removed. The floor is dimensioned so it will fit between the stanchions 44 and between the stanchions 56, both when those stanchions are in vertical position and when those stanchions are in horizontal position. Consequently, the floor can be slipped into the support 20 when the edge 40 has been removed, and it can then be assembled in the position shown in Fig. 5. At such time the floor will rest upon and be fully supported by the angles 26. This floor is further protection against the entry of dirt and water into the support 20.

A number of hooks 92 are secured to the stanchions 44, 56, and 68, and those hooks engage and support the frame of framed bed springs 94. As a result, the framed bed springs 94 can be set solidly in place and can support the weight of persons lying recumbent on those springs. The hooks also enable the springs 94 to provide additional stiffening for the portable structure when it is extended to form the shelter. Mattresses 96 can be placed upon the springs 94, and then blankets 98 or other bed clothing can be used to make the user comfortable. If desired, the upper spring 94 can have its inner edge released from the hooks; and in such case, that spring will be suspended vertically by its outer edge and will simulate the back of a couch. Moreover, if desired, the springs 94 can be stored overhead during the daytime, thus providing additional room for the occupant or occupants.

When the structure is folded, or when the springs 94 are not supported on hooks 92, those springs will rest upon the three angles 30, 32 and 34 and will provide adequate support for the mattresses 96 and the blankets 98. The springs and mattresses can also provide substantial support for the door 50, stanchions 68, spacing plates 60, and plate 84. Stored in this manner, the various parts of the structure are quite compact.

Loops 100 are provided on the exterior of the support 20, and those loops can receive ropes where additional support for the shelter is required. Those ropes can be secured to trees or rocks, and they will steady the shelter against the heaviest winds. In most instances such additional support will not be required because the engagement of rods 18 and guides 16 will enable the shelter to withstand most winds. Moreover, the engagement of stanchions 44 and 56 with the receptacles 62, the engagement of the floor panels 88 with stanchions 44 and 56, the engagement of walls 54 and 58 with stanchions 44, 56 and 68, and the engagement of side panels 70, 72, and 74 with the stanchions 44 and 56 make the shelter quite rigid and completely self-supporting. In fact, the shelter is so self-supporting that the vehicle can be moved off and the shelter will stand rigidly. However, where sudden wind storms are anticipated, it may be desirable to have the rods 18 engage the guides 16, or to secure the shelter to trees.

Loops 100 also are used to secure the support 20 solidly to the top of the automotive vehicle. Straps 104 pass through the loops 100 and then pass through hooks which extend under the gutters customarily provided on the sides of automotive vehicles; and when straps 104 are pulled tight, the support 20 will be held solidly against shifting longitudinally of the guides 16. The guides 16 are themselves solidly held in position by belts 102 which pass through loops in the ends of the transverse rods 14 and through hooks which fit under the gutters.

Where the vehicle has a rather blunt rear end, as does the vehicle 10, the guides 16 can extend longitudinally of the vehicle. The guides 16 can also be extended longitudinally of station wagons. However, where the vehicle is a coupe or has a streamlined rear end, as does the vehicle 105 in Fig. 2, the guides 16 must extend transversely of the vehicle. The guides 16 in Fig. 2 are supported by rods 106, and the rods 106 are held by suction cups 12.

The side walls of the shelter have been shown as being made of three sections each of stiff material that are hinged together; but if desired each of the side walls can be made as one piece of flexible material such as canvas, duck or other fabric. The fabric will preferably be treated to make it moisture-resistant. Where fabric walls are used, they should have their upper edges secured to support 20 and angles 26, and should have their lower edges free for selective securement to stanchions 44 and 56, and 68. When not in use, the fabric walls can be rolled up and held within support 20 by straps. The fabric walls will have their slots 80 framed with stiff material such as metal, and those frames will receive and hold the latches 82. The fabric side walls will not be able to give as much rigidity to the shelter as do the metal or wood stiff walls 54, 58, 70, 72 and 74; but they will still be able to provide considerable resistance against shifting. The exact amount of resistance to shifting will be determined in each instance by the strength and stiffness of the material used.

To extend the portable structure provided by the present invention, it is only necessary to remove edge 40, loosen the straps 104, slide the rods 18 and support 20 until that support projects beyond the side of the vehicle, pull on the stanchions 44 and 56 until the force of spring clips 108 is overcome, move the stanchions and the end walls 54 and 58 until they are vertical, place the spacing plates 60 beneath and in register with the lower ends of the stanchions 44 and 56, place the plate 84 approximately midway between the spacing plates 60, loosen straps 78 to let down side panels 70, 72 and 74, secure those panels to stanchions 44 and 56 by latches 82, insert the floor panels 88 and 90 so they press the panels 74 outwardly against the confining projections 86 on plate 84, insert stanchions 68, secure walls 54 and 58 to stanchions 68 with latches 82, and then fit the framed bed springs 94 over the hooks 92. The entire operation can be done easily and with little effort because the weight of the support 20 is fully carried by the vehicle through the medium of guides 16 and rods 18. If the day is warm and dry, and if privacy is not required, the door 50 need not be assembled with stanchion 44; but where desired, it can be assembled with that stanchion merely by placing its hinge plate in register with the hinge plates 48 on stanchion 44. To fold the structure, the steps need only be followed in inverse order; the removal of the edge 40 facilitating insertion of the various parts into the support 20.

The various parts of the portable structure provided by the present invention can be fitted into a small space; and as a result, the overall height of support 20 need only be eight (8) inches where the walls are of stiff material, and the overall height of support 20 need only be five (5) inches where the walls are of fabric. A support of these dimensions is easy to handle and easy to store, and it does not constitute an undue wind load for the vehicle.

The stanchions 44, 56 and 68 will preferably be as tall as the combined height of the automotive vehicle, the suction cups 12, and the bars 14 or 106. This height can be varied considerably by varying the height of the bars 14 or 106; and that height can usually be made great enough to permit occupants to enter the shelter without stooping. For those occupants who are unusually tall it may be necessary to stoop a little when entering the shelter, and those occupants should be able to stand erect within the shelter since the support 20 provides additional head room.

The support 20 can easily be taken down from the top of the vehicle, and can be stored in a small space. If desired, that support can be inverted and used as a boat.

Whereas a preferred embodiment of the present invention has been shown and described it should be obvious to those skilled in the art that various changes may be made in the form of the invention without affecting the scope thereof.

What I claim is:

1. A portable structure that when folded can be carried atop an automotive vehicle and that when extended forms a shelter in which one or more persons can sojourn in comfort and that comprises a support with downwardly directed edges that constitutes a water-tight, open-bottomed inclosure, channels with their open sides in confronting relation that are adapted to be secured to the top of an automotive vehicle, said channels being parallel to each other, rods carried by said support that are disposable within said channels to hold said support in position, rollers on said rods that engage said channels and facilitate reciprocatory movement of said rods, said rods being separable from said channels, stanchions that are rotatably secured to said support and can be extended vertically downward from said support or can be disposed in a horizontal position adjacent said support, said stanchions being approximately as long as said automotive vehicle is high, spacing plates with receptacles that receive the lower ends of said stanchions and resist tilting movement or horizontal movement of said stanchions, a floor that is supportable by said spacing plates, walls secured at their upper edges to said support but being adapted to extend between the lower edge of said support and said floor, said walls being releasably securable to said stanchions at spaced points to stiffen said shelter and to prevent intrusion, confining members that are spaced on opposite sides of said floor and hold said walls closely adjacent said floor, a door pivotally secured to one of said stanchions, said door being separable from said stanchion, a lock to releasably hold said door closed, framed bed springs dimensioned to fit between and be supported by said stanchions, transversely extending elements within said support to carry said floor and springs, and loops on said support to receive ropes or straps, said channels being adapted to hold said support above the ground while said structure is being extended or folded, said channels being adapted to steady said structure after it is extended and is supported by the ground, one edge of said support being removable to permit insertion of the floor and springs within said support.

2. A portable structure that when folded can be carried atop an automotive vehicle and that when extended forms a shelter in which one or more persons can sojourn in comfort and that comprises a support with downwardly directed edges that constitutes a water-tight, open-bottomed inclosure, guides that are adapted to be secured to the top of an automotive vehicle, interfitting surfaces on said guides and said support that hold said support above the ground while permitting movement of said support relative to said guides, said support being separable from said guides, stanchions that are rotatably secured to said support and can be extended vertically downward from said support or can be disposed in a horizontal position adjacent said support, spaced receptacles that receive the lower ends of said stanchions and space them apart predetermined distances, a floor, walls disposed between said support and said floor, said walls being movable adjacent said support, said walls being secured to said stanchions, confining members that are spaced on opposite sides of said floor and hold said walls closely adjacent said floor, framed bed springs dimensioned to engage said stanchions, and interfitting surfaces on said stanchions and said springs that hold said springs in position relative to said stanchions, the engagement between said support and said stanchions, said springs and said stanchions, said walls and said stanchions, said confining members and said walls, and said receptacles and said stanchions making said structure self-supporting in extended position.

FREDERICK NEUHAUS.

REFERENCES CITED

The following references are of record in the file of this patent:

UNITED STATES PATENTS

| Number | Name | Date |
|---|---|---|
| 690,306 | Leppert | Dec. 31, 1901 |
| 1,439,277 | Trout | Dec. 19, 1922 |
| 1,562,249 | Oakley | Nov. 17, 1925 |
| 1,633,820 | Long | June 28, 1927 |
| 1,871,871 | Woods | Aug. 16, 1932 |
| 2,245,465 | Cole | June 10, 1941 |

FOREIGN PATENTS

| Number | Country | Date |
|---|---|---|
| 360,065 | Great Britain | 1931 |